United States Patent
Ingram

(10) Patent No.: US 8,272,310 B2
(45) Date of Patent: Sep. 25, 2012

(54) BULLET RESISTANT SHIELD AND STORAGE COMPARTMENT FOR MOTORCYCLES AND THE LIKE

(76) Inventor: Dennis Ingram, Cherry Hill, NJ (US)

( * ) Notice: Subject to any disclaimer, the term of this patent is extended or adjusted under 35 U.S.C. 154(b) by 0 days.

(21) Appl. No.: 12/793,042

(22) Filed: Jun. 3, 2010

(65) Prior Publication Data

US 2011/0296980 A1    Dec. 8, 2011

(51) Int. Cl.
  *F41H 5/14*  (2006.01)
(52) U.S. Cl. .......... 89/36.09; 89/36.07; 280/288.4; 280/304.3
(58) Field of Classification Search .......... 89/36.01, 89/36.07, 36.08, 36.02, 36.09; 280/281.1, 280/288.4, 304.3; D12/114
  See application file for complete search history.

(56) References Cited

U.S. PATENT DOCUMENTS

| | | | | |
|---|---|---|---|---|
| 558,812 | A * | 4/1896 | Hunt et al. | 2/455 |
| 600,364 | A * | 3/1898 | Hill et al. | 224/445 |
| D144,344 | S * | 4/1946 | Alexander et al. | D12/12 |
| 2,401,245 | A | 5/1946 | Hobbs | |
| 3,362,596 | A * | 1/1968 | Bostwick | 224/417 |
| D224,074 | S * | 6/1972 | Harmon, Jr. et al. | D12/410 |
| D237,167 | S * | 10/1975 | Hanes, Jr. et al. | D12/410 |
| 4,045,077 | A * | 8/1977 | DeVone | 296/78.1 |
| 4,050,615 | A * | 9/1977 | Kline | 224/429 |
| D247,776 | S * | 4/1978 | Kramer | D12/410 |
| 4,163,513 | A * | 8/1979 | Kramer | 224/413 |
| 4,212,485 | A * | 7/1980 | Kramb | 280/766.1 |
| D274,233 | S * | 6/1984 | Kusz | D12/410 |
| 4,577,786 | A * | 3/1986 | Dowrick et al. | 224/448 |
| 5,556,117 | A * | 9/1996 | Szeremeta | 280/47.11 |
| D374,848 | S * | 10/1996 | Liles et al. | D12/114 |
| 5,619,007 | A | 4/1997 | Mena et al. | |
| 5,785,779 | A | 7/1998 | McGee et al. | |
| 6,807,890 | B1 | 10/2004 | Fuqua | |
| 6,840,417 | B2 * | 1/2005 | Heinrich et al. | 224/413 |
| 6,942,053 | B2 * | 9/2005 | Hinton | 180/209 |
| 2005/0034910 | A1 * | 2/2005 | Hinton | 180/209 |
| 2005/0035583 | A1 * | 2/2005 | Hinton | 280/755 |
| 2011/0221177 | A1 * | 9/2011 | Srabstein | 280/756 |

OTHER PUBLICATIONS definition of "clear" from http://education.yahoo.com/reference/dictionary/entry/clear.*

* cited by examiner

*Primary Examiner* — Benjamin P Lee
(74) *Attorney, Agent, or Firm* — Menina E. Cohen

(57) ABSTRACT

A two-wheeled vehicle bullet resistant shield and storage compartment, comprising a two-wheeled vehicle, having a front wheel and a rear wheel. The rear wheel including a removable first compartment and second compartment. The removable first compartment and second compartment being mounted to said rear wheel and the rear wheel including an interconnected first inside panel, second inside panel, third outside panel and fourth outside panel.

1 Claim, 4 Drawing Sheets

FIG. 5
FIG. 6
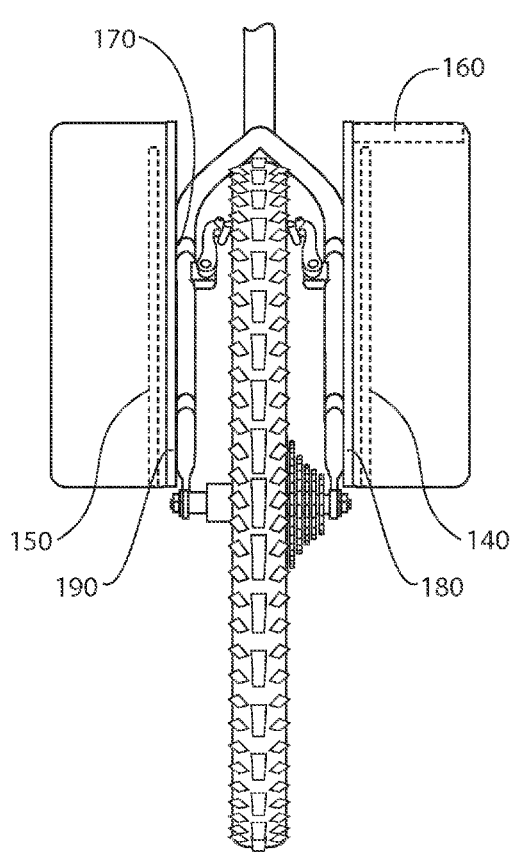
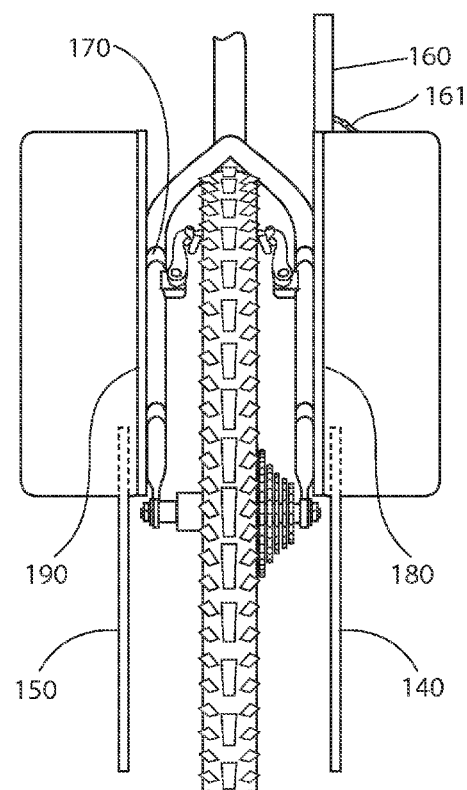

BULLET RESISTANT SHIELD AND STORAGE COMPARTMENT FOR MOTORCYCLES AND THE LIKE

REFERENCE TO A MICROFICHE APPENDIX

Not Applicable.

CROSS REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

This invention relates to shields and, more particularly, to a bullet resistant field shield and storage compartment for motorcycles and the like for protecting a rider from airborne projectiles while operating a two-wheeled vehicle.

BACKGROUND OF THE INVENTION

Peace officers use bicycles and motorcycles in the performance of their daily duties throughout the United States. Such transportation is less expensive than conventional automobiles and offers an officer flexibility in where to park and store the vehicle. In addition, the maintenance, fuel, and insurance costs are reduced. Unfortunately, peace officers on bicycles and motorcycles are extremely vulnerable to gunfire. There is simply no room on the bicycle for an enveloping armor protection system, a vest of the "flak jacket" type is out of the question, and a clipboard or portable shield is too bulky and cumbersome. Based on the above mentioned needs, it would be advantageous to provide a means for protecting a rider from airborne projectiles while operating a two-wheeled vehicle.

Accordingly, a need remains for a bullet resistant shield and storage compartment for motorcycles and the like in order to overcome the above-noted shortcomings. The present invention satisfies such a need by providing an apparatus that is convenient and easy to use, is lightweight yet durable in design, and protects a rider from airborne projectiles while operating a two-wheeled vehicle. The apparatus can be a lifesaver whenever violent situations are encountered, and also provide a secure storage space. The apparatus easily attaches to all two-wheeled vehicles and allows a rider to be confident and secure while on patrol. The apparatus can be used by law enforcement, as well as private security firms. The present invention is simple to use, inexpensive, and designed for many years of repeated use.

Prior art exists in the area of collapsible ballistic shields and bicycle mounted shield systems. U.S. Pat. No. 5,619,007 to Mena et al. includes a bicycle mounted is bullet proof armor shield system made of a bullet proof material. U.S. Pat. No. 2,401,245 to L. J. Hobbs includes a combined receptacle for first aid accessories and shield for attachment to bicycles.

Another patent of interest is U.S. Pat. No. 5,785,779 to McGee et al. which provides a protective tire liner positioned between the bicycle inner tube and the bicycle outer tire of a bicycle wheel. As well as U.S. Pat. No. 6,807,890 to Fuqua this includes a portable ballistic shield.

While these devices fulfill their respective, particular objectives and requirements, the aforementioned patents do not disclose a motorcycle and bicycle specific permanently mounted bullet resistant shield and the like.

SUMMARY OF THE INVENTION

A bullet resistant shield and storage compartment for a two-wheeled vehicle, having a front wheel and a rear wheel. The rear wheel includes a removable first compartment and second compartment. The removable first compartment and second compartment mounted to the rear wheel and the rear wheel including an interconnected first inside panel, second inside panel, third outside panel and fourth outside panel.

It is an object of the invention to provide a bullet resistant shield and storage compartment for use on two wheeled vehicles large enough to protect the body of an average sized person.

It is an object of the invention to provide bullet resistant shield and storage compartment which includes drop down panels for further protection.

It is an object of the invention to provide a bullet resistant shield and storage compartment to provide a bullet resistant shield to provide vital areas of a person's body.

It is therefore an object of the present invention to provide a new bullet resistant shield and storage compartment which has many of the advantages of the shields mentioned heretofore and many novel features that result in bullet resistant shield and storage compartment which is not anticipated, rendered obvious, suggested, or even implied by any of the prior art shields, either alone or in any combination thereof.

The above and yet other objects and advantages of the present invention will become apparent from the hereinafter set forth Brief Description of the Drawings, Detailed Description of the Invention, and Claims appended herewith.

BRIEF DESCRIPTION OF THE DRAWINGS

FIG. 1 is a perspective view of the bullet resistant shield and storage compartment for motorcycles and the like.

FIG. 2 is a perspective view of FIG. 1 illustrating use of the bullet resistant shield and storage compartment for motorcycles and the like.

FIG. 5 is rear view of the bullet resistant shield and storage compartment as attached to the motorcycle and the like when collapsed.

FIG. 6 is rear view of the bullet resistant shield and storage compartment as attached to the motorcycle and the like when in use.

DETAILED DESCRIPTION OF THE INVENTION

Figure 1:
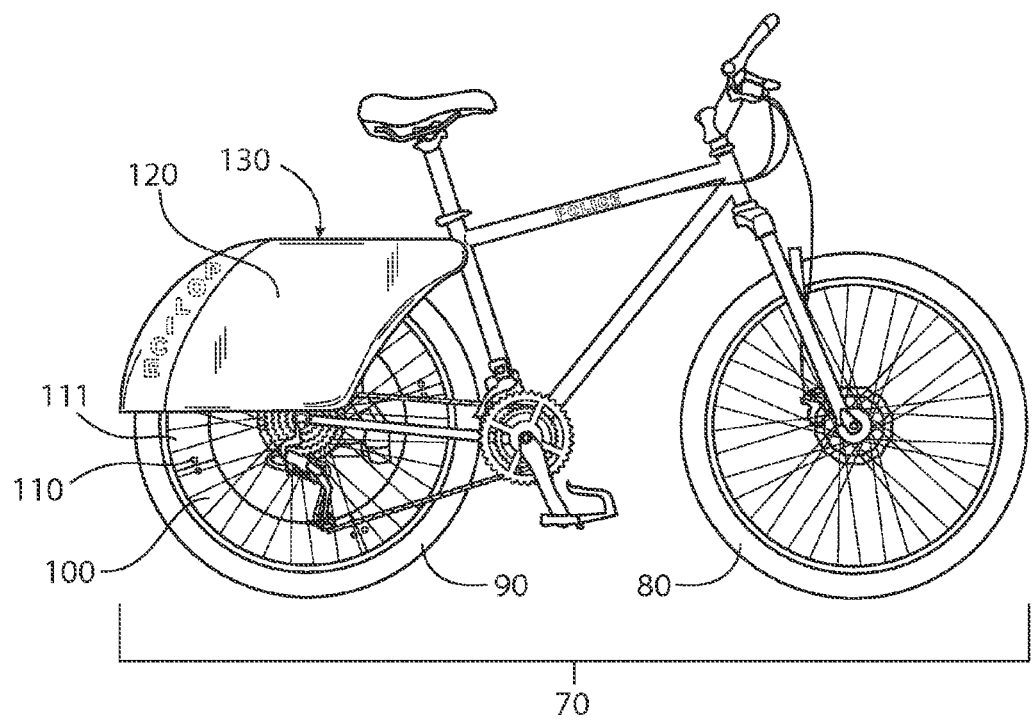
Figure 2:
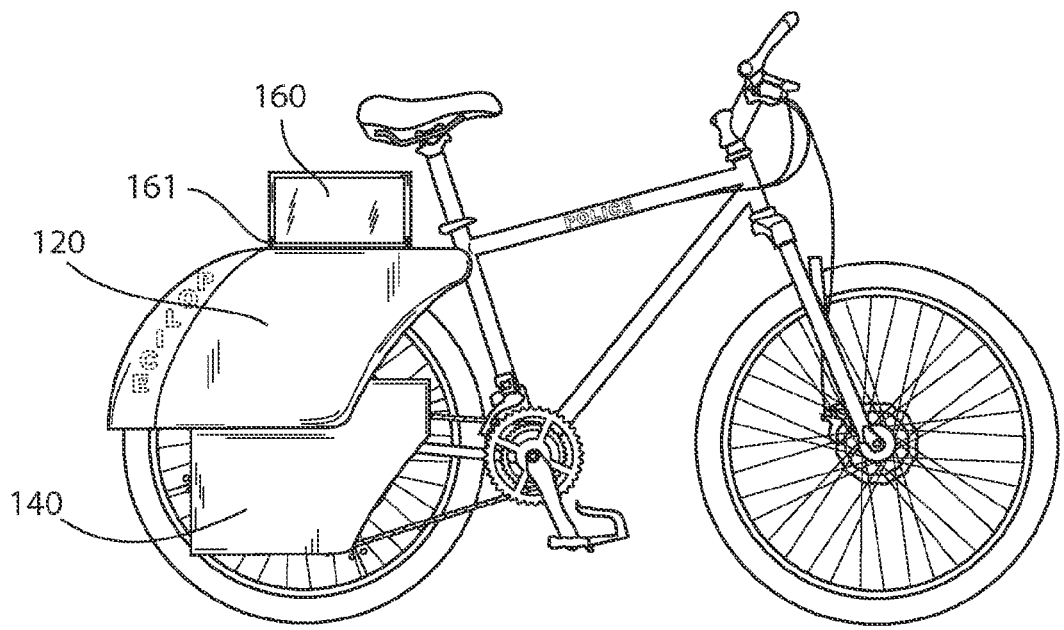
Figure 3:
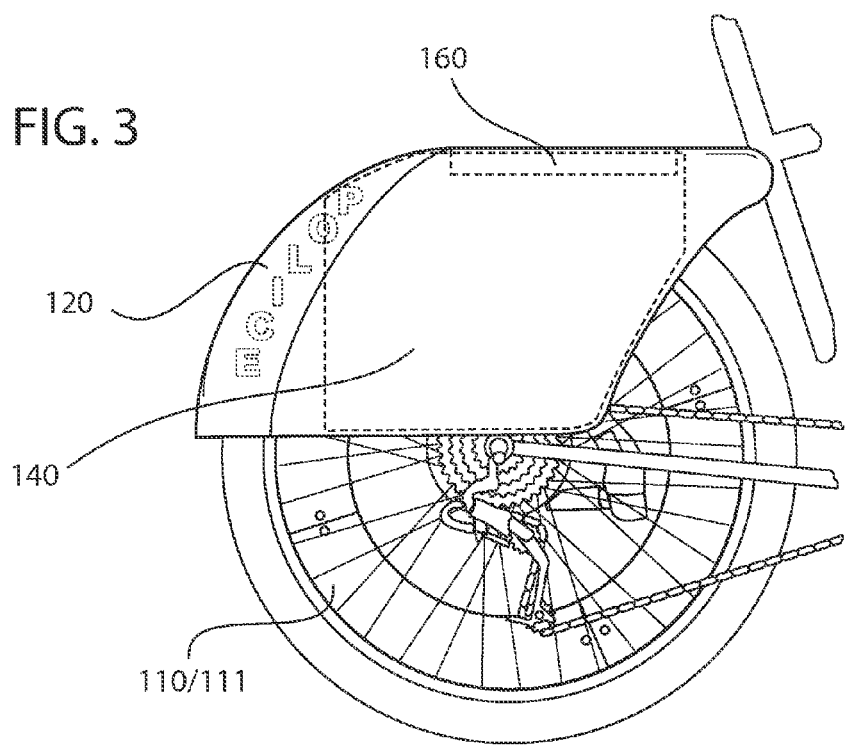
FIG. 3 is a side perspective view of the bullet resistant shield and storage compartment when collapsed.
Figure 4:
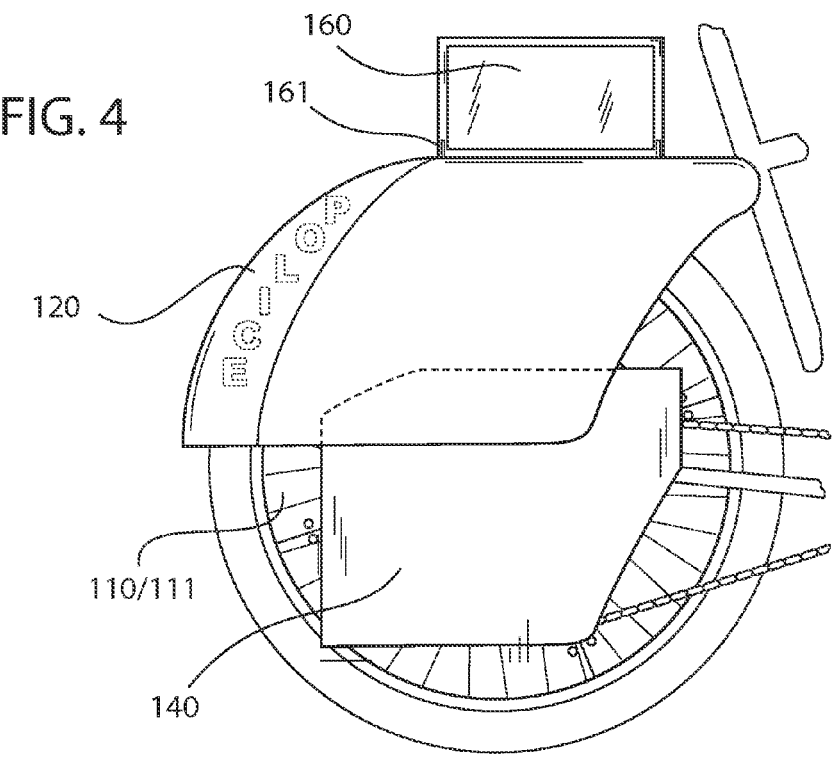
FIG. 4 is a side perspective view of the bullet resistant shield and storage compartment when in use.

A bullet resistant shield and storage compartment for a two-wheeled vehicle 70, having a front wheel 80 and a rear wheel 90. The rear wheel 90 includes a removable first compartment 120 and second compartment 130. The removable first compartment 120 and second compartment 130 mounted to the rear wheel 90 and the rear wheel 90 including an interconnected first inside panel 100, second inside panel 110, third outside panel 109 and fourth outside panel 108.

The first compartment 120 and second compartment 130 have stationary rear walls 180/190. Preferably the stationary rear walls 180/190 are comprised of a Kevlar® or other bullet resistant material. The first compartment 120 and second compartment 130 should be designed to easily refit or retrofit an existing bicycle 70 or motorcycle frame and be made of "off the shelf material" so as to keep it simple. The first compartment 120 and second compartment 130 can be "after market" saddle bags refitted.

The first compartment 120 and second compartment 130 have drop down panels 140/150. The drop down panels 140/150 are preferably comprised of a bullet resistant material. The bullet resistant drop down panels 140/150 must be wide enough to cover the width of a normal person, at the shoulder. The drop down panels 140/150 would preferably drop down or potentially pop up, to cover the vital areas of the body as an officer crouches behind it for protection.

The first compartment 120 includes a hinged flip up panel 160 preferably comprised of a bullet resistant material. The hinged flip up panel is comprised of a clear material. The hinge 161 of the flip up panel shall be preferably comprised of a bullet resistant material or a material to withstand the pressure of a bullet penetrating the hinge directly. The flip up panel 160 and be of a bullet resistant being comprised of a clear material, so an officer can visually see through the flip up panel 160 to return fire.

The rear wheel 90 includes an interconnected first inside panel 100, second inside panel 110, third outside panel 109 and fourth outside panel 108 interconnected 111 first inside panel 100, second inside panel 110, third outside panel 109, and fourth outside panel 108 are comprised of a bullet resistant material. Alternatively the first inside panel 100, second inside panel 110, third outside panel 109 and fourth outside panel 108 interconnected first inside panel 100, second inside panel 110, third outside panel 109, and fourth outside panel 108 are connected directly to the rear wheel 90.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

What is claimed is:

1. A two-wheeled vehicle bullet resistant shield, comprising:
   (a) a two-wheeled vehicle, having a front wheel and a rear wheel;
   (b) said rear wheel including a removable first compartment and second compartment;
   (c) said removable first compartment and second compartment being mounted to said rear wheel;
   (d) said rear wheel including an interconnected first inside panel, second inside panel, third outside panel and fourth outside panel;
   (e) said first compartment and second compartment include telescoping panels that are extendable from the compartments;
   (f) said first compartment includes a hinged flip up panel;
   (g) said telescoping panels are comprised of a bullet resistant material; and
   (h) said hinged flip up panel is comprised of a transparent material.

* * * * *